US010957109B2

(12) United States Patent
Bender et al.

(10) Patent No.: US 10,957,109 B2
(45) Date of Patent: Mar. 23, 2021

(54) DYNAMIC PARTITION OF AUGMENTED REALITY REGION

(71) Applicant: INTERNATIONAL BUSINESS MACHINES CORPORATION, Armonk, NY (US)

(72) Inventors: Michael Bender, Rye Brook, NY (US); Sarbajit K. Rakshit, Kolkata (IN); Shikhar Kwatra, Durham, NC (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/385,080

(22) Filed: Apr. 16, 2019

(65) Prior Publication Data
US 2020/0334907 A1 Oct. 22, 2020

(51) Int. Cl.
G06F 3/0481 (2013.01)
G06T 11/40 (2006.01)
(Continued)

(52) U.S. Cl.
CPC ........ G06T 19/006 (2013.01); G06F 3/04815 (2013.01); G06T 11/40 (2013.01); G06T 19/20 (2013.01)

(58) Field of Classification Search
CPC ....... B25J 19/06; B25J 9/1676; G05B 19/406; G05B 19/4061; G05B 2219/32014;
(Continued)

(56) References Cited

U.S. PATENT DOCUMENTS 8,018,329 B2  9/2011  Morgan et al.
9,043,329 B1  5/2015  Patton et al.
(Continued)

FOREIGN PATENT DOCUMENTS

WO  WO2018220438 A3  12/2018

OTHER PUBLICATIONS

Peter Mell et al, The NIST Definition of Cloud Computing, National Institute of Standards and Technology, Publication 800-145, 2011, entire document.

Primary Examiner — Jin Cheng Wang
(74) Attorney, Agent, or Firm — Patrick J. Daugherty; Daugherty & Del Zoppo Co., LPA

(57) ABSTRACT

Aspects of the present invention define different boundary dimension values for different respective areas relative to a reference geographic location as a function of values of attributes of an event occurring at the location and of a user of an augmented reality device. Aspects thus render the area within a display of the reference geographic location by a display device of the user augmented reality device in a display format that visually distinguishes the visually rendered areas from each other within display of the reference geographic location, the format conveys different values of use permission determined for the user for each of the areas as a function of event and user attribute values; dynamically revise one of the boundary dimension values in response to a change in attribute value of the location and the event; and revise the area rendering as a function of the revised boundary dimension value.

20 Claims, 5 Drawing Sheets

(51) Int. Cl.
*G06T 19/00* (2011.01)
*G06T 19/20* (2011.01)

(58) Field of Classification Search
CPC ........... G05B 2219/40203; G05B 2219/49137; G05B 2219/50193; G06F 3/011; G06T 15/20; G06T 19/006; G06T 19/20; G06T 2210/62; G06T 2219/2012; G06T 2219/2016
See application file for complete search history.

(56) References Cited

U.S. PATENT DOCUMENTS

| | | |
|---|---|---|
| 9,715,008 B1 | 7/2017 | Côté et al. |
| 10,108,859 B1 | 10/2018 | Suiter et al. |
| 2006/0004605 A1* | 1/2006 | Donoghue ............. G16H 10/60 705/2 |
| 2011/0043515 A1 | 2/2011 | Stathis |
| 2013/0099977 A1 | 4/2013 | Sheshadri et al. |
| 2014/0164118 A1 | 6/2014 | Polachi |
| 2014/0357295 A1 | 12/2014 | Skomra et al. |
| 2015/0109338 A1 | 4/2015 | McKinnon et al. |
| 2017/0078840 A1 | 3/2017 | Saurav et al. |
| 2018/0349654 A1* | 12/2018 | Takeshima ............. H04N 5/247 |
| 2019/0147655 A1* | 5/2019 | Galera .................... G06T 15/20 345/419 |
| 2019/0340909 A1* | 11/2019 | Nguyen ................. G08B 21/02 |
| 2019/0377322 A1* | 12/2019 | Hornung ............ G05B 19/4061 |

* cited by examiner

DYNAMIC PARTITION OF AUGMENTED REALITY REGION

TECHNICAL FIELD

The present invention relates generally to methods, systems, and computer program products for automated, augmented reality interfaces. More particularly, the present invention relates to methods, systems, and computer program products for visualizing partition regions within augmented reality device display of the visual surroundings of a user.

BACKGROUND

Augmented reality (AR) refers to the interaction of visual data or perception of environmental surroundings with "augmented" image information projected from camera feeds or other sources wherein the visual representation of the real-world surrounding a user includes the overlaid, augmented image information. Augmented reality imagery may be referred to as "constructive" when additive to the visible natural environment (for example projecting translucent walking directions over the viewpoint of a sidewalk, wherein the sidewalk surface texture remains visible through the directions), or "destructive" when it occludes or masks portions of the environment. When effectively interwoven with the physical world imagery, augmented image information may be perceived as another aspect or attribute of a real-world environment, for example transforming non-visual environmental data such as ambient temperature, wind speed, etc., into displayed objective values, icons, etc., that convey values or qualities of the environment to the user.

BRIEF SUMMARY

In one aspect of the present invention, a computer-implemented method includes defining a first boundary dimension value for a first area with respect to a reference geographic location as a function of values of an attribute of an event occurring at the location and an attribute of a user of an augmented reality device; rendering the first area within a display of the reference geographic location by a display device of the user augmented reality device in a display format that visually distinguishes the first area from a second area visually rendered within the display of the reference geographic location, wherein the display format conveys different values of use permission determined for the user for each of the first area and the second area as a function of values of the event attribute and the user attribute, and wherein the second area is defined by a second boundary dimension value that is different from the first boundary dimension value; dynamically revising the first boundary dimension value as a function of a value of the user attribute in response to a change in value of one of the reference geographic location attribute and the event occurrence attribute; and revising the rendering of the first area within the augmented reality device display as a function of the dynamically revised first boundary dimension value and the user attribute value.

In another aspect, a computer system has a hardware computer processor, computer readable memory in circuit communication with the computer processor, and a computer-readable storage medium in circuit communication with the computer processor and having program instructions stored thereon. The computer processor executes the program instructions stored on the computer-readable storage medium via the computer readable memory and thereby defines a first boundary dimension value for a first area with respect to a reference geographic location as a function of values of an attribute of an event occurring at the location and an attribute of a user of an augmented reality device; renders the first area within a display of the reference geographic location by a display device of the user augmented reality device in a display format that visually distinguishes the first area from a second area visually rendered within the display of the reference geographic location, wherein the display format conveys different values of use permission determined for the user for each of the first area and the second area as a function of values of the event attribute and the user attribute, and wherein the second area is defined by a second boundary dimension value that is different from the first boundary dimension value; dynamically revises the first boundary dimension value as a function of a value of the user attribute value in response to a change in a value of one of the reference geographic location attribute and the event occurrence attribute; and revises the rendering of the first area within the augmented reality device display as a function of the dynamically revised first boundary dimension value and the user attribute value.

In another aspect, a computer program product has a computer-readable storage medium with computer readable program code embodied therewith. The computer readable program code includes instructions for execution by a computer processor that cause the computer processor to define a first boundary dimension value for a first area with respect to a reference geographic location as a function of values of an attribute of an event occurring at the location and an attribute of a user of an augmented reality device; render the first area within a display of the reference geographic location by a display device of the user augmented reality device in a display format that visually distinguishes the first area from a second area visually rendered within the display of the reference geographic location, wherein the display format conveys different values of use permission determined for the user for each of the first area and the second area as a function of values of the event attribute and the user attribute, and wherein the second area is defined by a second boundary dimension value that is different from the first boundary dimension value; dynamically revise the first boundary dimension value as a function of a value of the user attribute value in response to a change in a value of one of the reference geographic location attribute and the event occurrence attribute; and revise the rendering of the first area within the augmented reality device display as a function of the dynamically revised first boundary dimension value and the user attribute value.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
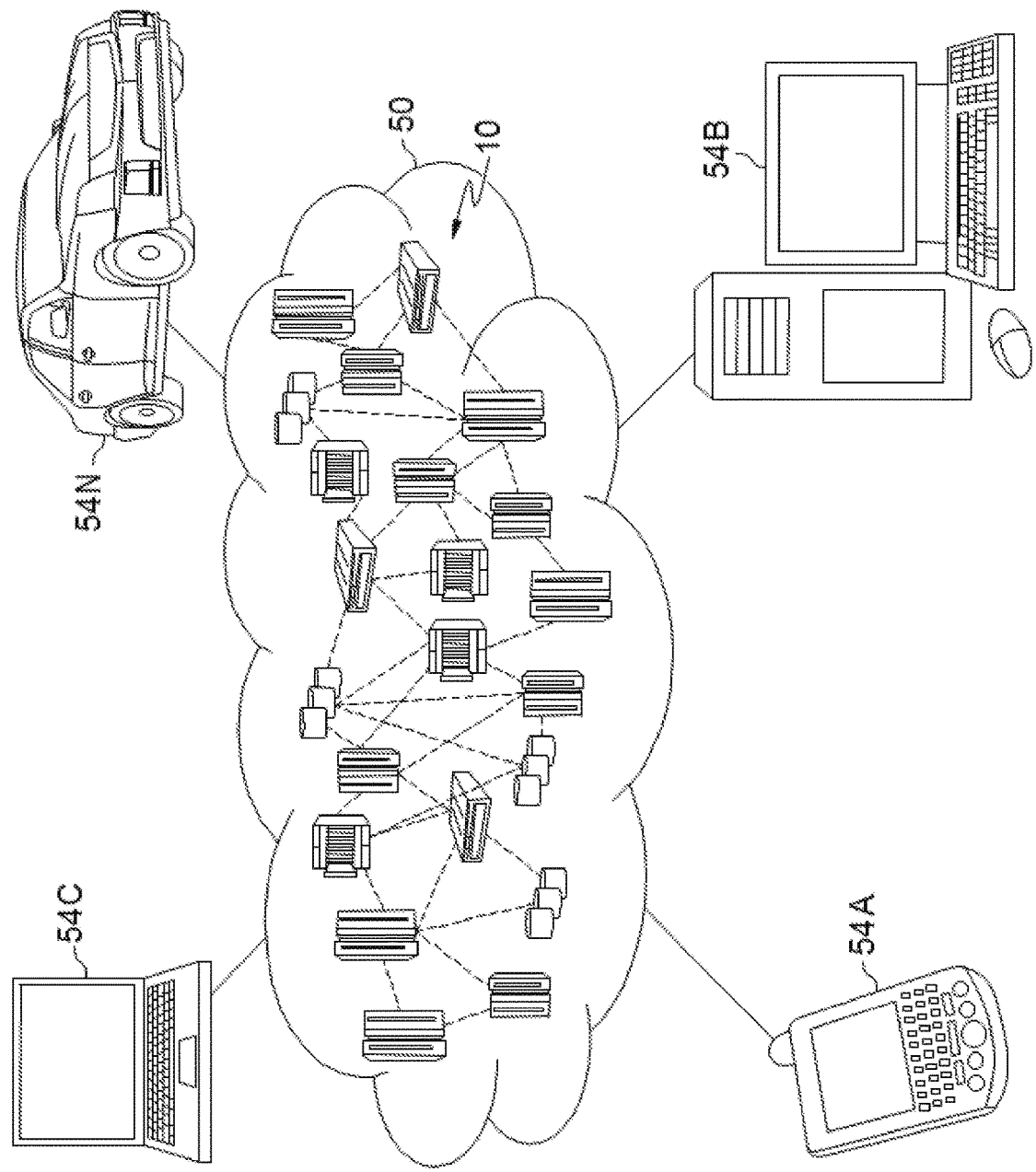
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
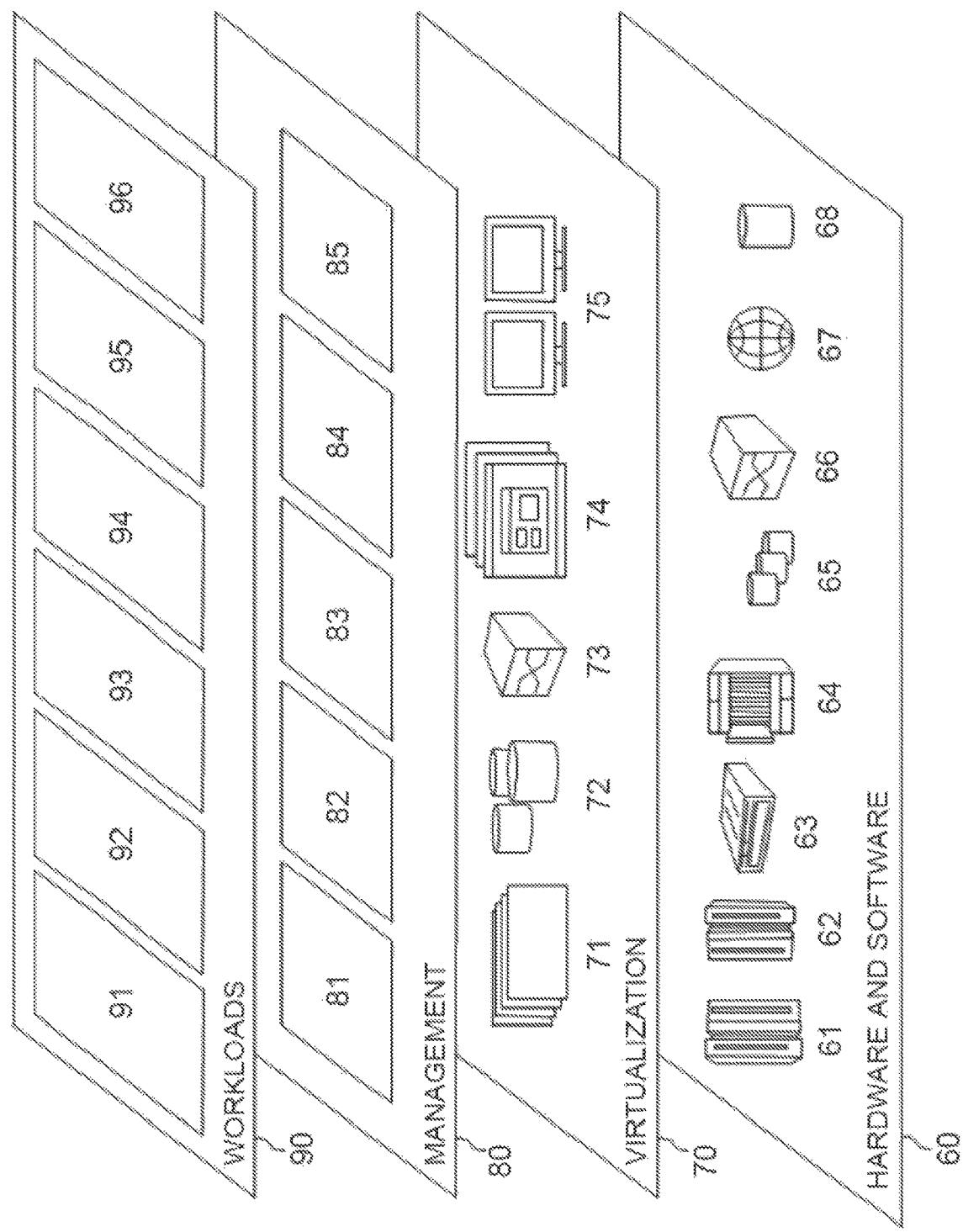
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a negotiative chat bot according to aspects of the present invention 96.

Figure 3:
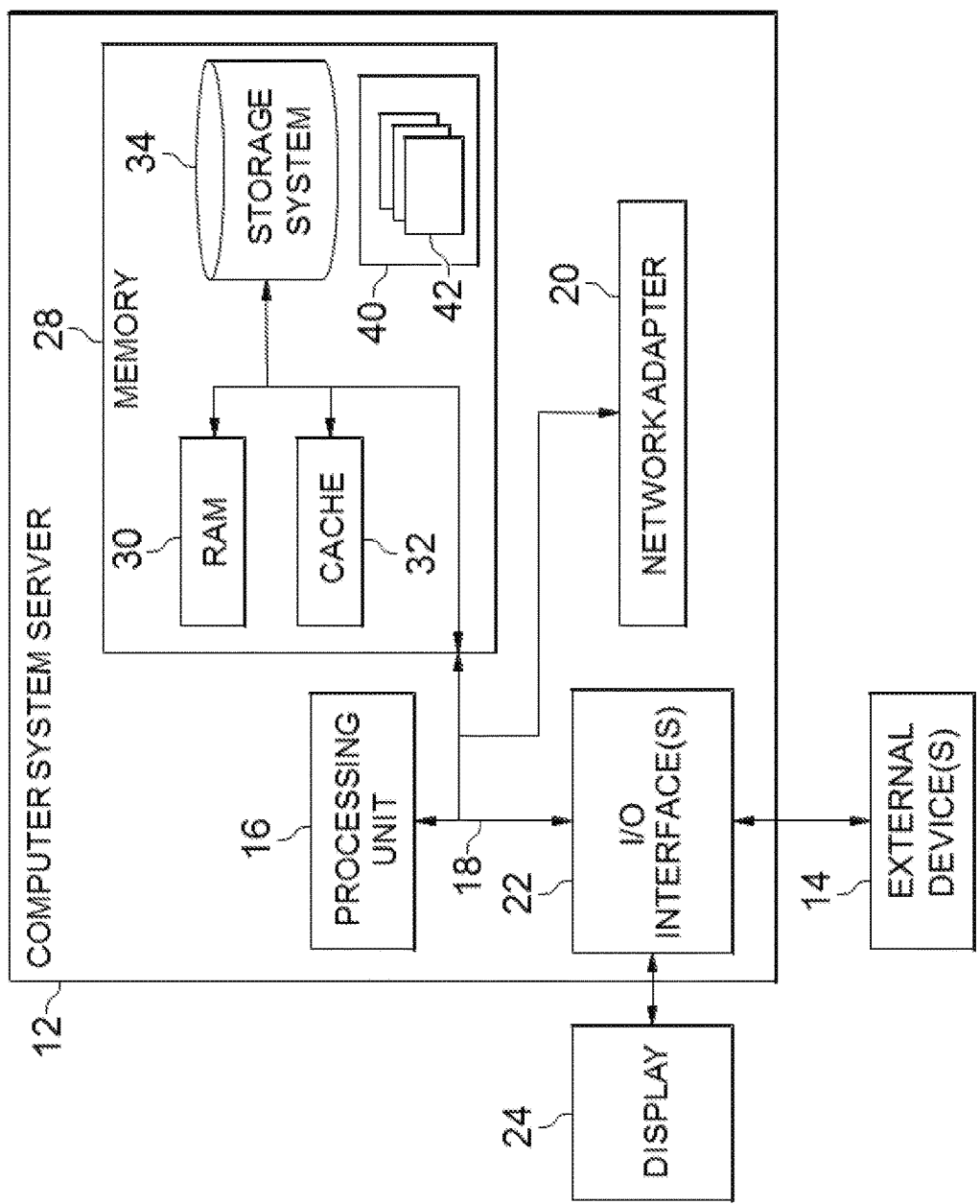
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
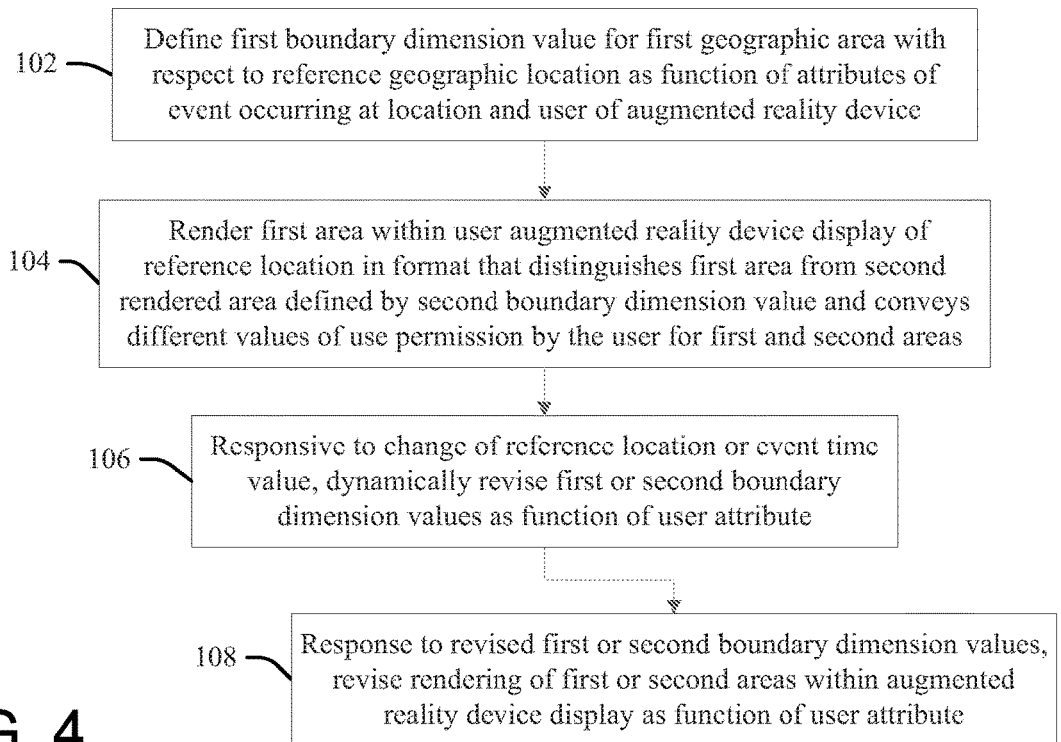
FIG. 4 is a block diagram illustration of an embodiment of the present invention.

FIG. 4 illustrates a system, process, or device according to an embodiment of the present invention. In response to, at 102 a processor that is configured according to the present invention (the "configured processor") defines a first (or set of) boundary dimension value(s) for a first area or region at a geographic location as a function of an attribute of an event occurring at the location (inclusive of an event occurrence time), and an attribute of a user of an augmented reality device. More particularly, the first boundary dimensions are generally proximate to or encompass and project from the location, wherein their values may dynamically vary over time relative to the event occurrence time.

At 104 the configured processor renders the first area within a display of the augmented reality device of the user in a format that visually distinguishes the first area from another (second) geographic region or area that is rendered within the display that is defined by another, different, second (set of) boundary dimension value(s). More particularly, the display format is selected to convey a difference in permission of use of each of the first and second regions by the user: for example, differences as to permission to use, build within, engage in commercial activities within, enter, pass-through, etc. In some embodiment the display format or data associated therewith distinguishes the characteristics of use with respect to an exclusionary time period or some other time value.

At 106 the configured processor dynamically revises, as a function of the user attribute, one or more values of the first and second boundary dimensions in response to a change of the reference geographic location of the event, the event occurrence time, or some other attribute of the event.

At 108 the configured processor revises the rendering (re-draws, reformats or otherwise revises) of the first and second regions within the augmented reality device display, which include revising their respective display formats indicative of use permission, as a function of the user attribute, in response to the revised value(s) of the first and second boundary dimensions.

More particularly, embodiments of the present invention generate an augmented reality display that defines and displays within a user's augmented reality display device (for example, glasses, goggles or other portable devices personal to the user) each of the different or distinguished (for example, usable or unusable) area portions of the physical world at respective geographic locations. The boundaries are generally dynamic, the embodiments re-drawing them in response to a changing distance of the user to a reference location, including as the user approaches and comes into view of the location through their device display.

Embodiments personalize and differentiate the definition and display (visualization) of different regions within augmented reality system displays that are distinguished by difference in exclusion or other use characteristics based on differences in personal attributes associated to any person, location, contextual situation, etc., and wherein the area boundaries dimensions can be static or dynamic in nature, including responsive to the movement of any object considered in defining the boundary values.

Figure 5:
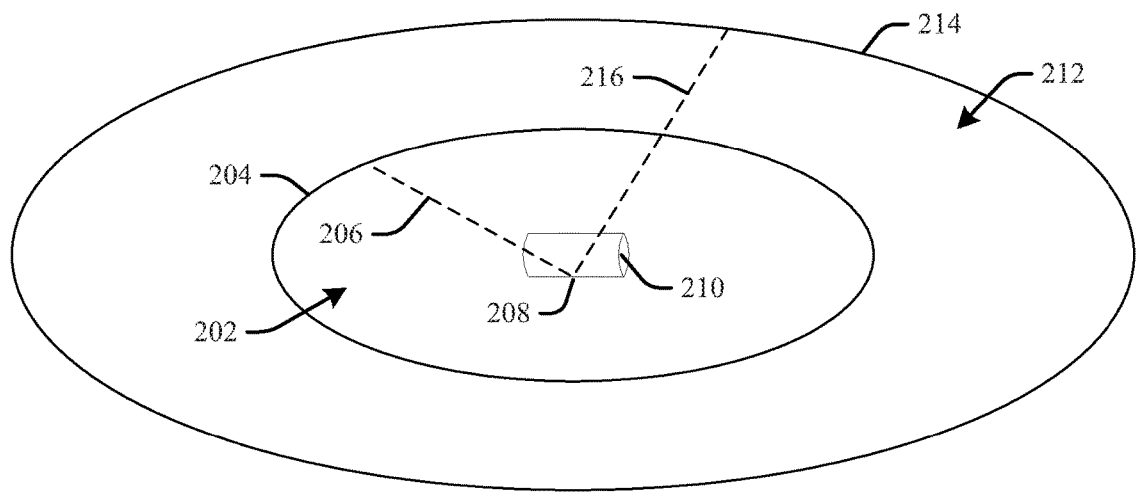
FIG. 5 is a graphical illustration of an implementation of an embodiment of the present invention.

FIG. 5 is a graphic illustration of the display of an augmented device wherein an embodiment determines or defines (at 102, FIG. 4) a first exclusion region or area 202 for a first user of an augmented reality system having a circular (for two-dimensional attributes) or spherical shape (for three-dimensional attributes or exclusion or permission behaviors, etc.) defined by outer dimensional boundary 204 that is defined a radius distance dimension 206 projecting from a reference location 208 of an object 210, wherein the first exclusion region 202 that defines a safe distance from the object 210 an as a function of identity attributes of both the object 210 and the first user viewing the scene.

In one example the object 210 is reported to a be a leaky container located on a pathway location 208 within a park, wherein a substance leaking from the container 210 is possibly (likely) a hazardous material (one to for which direct exposure may be harmful to the health of a person, or to cause contamination to the environment surrounding the container 210, etc.). Thus, in response to confirming that the identity attribute value of the first user meets a "first-responder" qualification category (for example, the first user has a hazardous materials responder or handling certification, or is an employee of a park or other entity having control of or responsibility for the object location and has job description duties inclusive of abating unsafe conditions, etc.), the first region 202 radius 206 is specified to have the value of a recommended minimum safe working distance from ignition or electromagnetic emission sources, in order to avoid ignition of flammable components of the leaking substance (for example, 25 meters). Thus, the first-responder user viewing the scene encompassing the object 210 is presented with an augmented reality display (at 108, FIG. 4) that depicts the safety zone 202 or its outer boundary 204 with unique coloring, highlighting or marking of visible items therein, so that the first-responder may quickly scan the scene for the presence of any potential ignition or electromagnetic emission source objects and revise their response accordingly (for example, approaching the object 210 only upon verifying that no objects within the first, working area 202 present an ignition or electromagnetic emission potential. In some embodiments the permission level conveyed to the first user is dependent upon the first user attribute qualification category meeting an entry requirement (for example, rendering the first area 202 or outer boundary 204 in flashing red coloring and with "WARNING DO NOT ENTER" text information in response to determining that the user certification does not meet the requisite permission to engage the object, or in yellow coloring with "CAUTION" or "HOT ZONE" text labeling in response to determining that the user certification meets the requisite permission to engage the object).

In contrast, the embodiment also defines a second exclusion zone 212 that is larger and encompasses the first zone 202 for a different, second "civilian" or "bystander" user of the augmented reality system that has a corresponding circular or spherical shape defined by another, larger outer dimensional boundary 214 that is defined on a larger radius distance dimension 216 projecting from the reference location 208. In the present example the radius 216 value is a minimum recommended safe distance from the object 210 to avoid personal injury from exposure hazards likely or potentially arising from exposure to substances released from the container 210 (for example, 100 meters). Thus, the second, "by-stander" user viewing the scene encompassing the object 210 is presented with an augmented reality display (at 108, FIG. 4) that depicts the larger exclusion zone 212 or its outer boundary 214, warning the user from entering the exclusion zone 212, or notifies the user that other users that do not have requisite certifications or qualifications should be excluded from the second area, until the situation is resolved (as communicated by additional revisions to the augmented display).

Embodiments dynamically revise the respective zone dimensions 206 and 216 (at 108, FIG. 4) in response to changes in state or other values of the user or object attributes over time. For example, in response to the first-responder, first user determining that substances within or leaking from the container 210 are not hazardous chemicals, but are instead inert products, the configured processor revises the first zone dimension value 206 to a generic working area safety buffer (for example, to two meters) while the first-responder approaches and removes the object 210 and cleans-up any leaked product, and wherein the second safety zone radius 216 is reduced to a different, smaller value chosen to prevent the by-stander from splashed by the leaking substance (for example, to three meters).

Exclusion zones may be defined with respect to limiting or granting access to roadways, walkways, buildings or other infrastructure elements impacted by an object and location of event. For example, in response to identifying a celebrity appearing at a speaking event location over a specified time period and date, the configured processor determines that vehicular traffic historically associated with other appearance of the same or similar celebrities (ones sharing common metrics of general regional popularity or category of speaker, such as ex-university presidents of comparable-sized universities, political candidates for similar representative office sizes, etc.) indicates that traffic jams will occur on local roadways within one kilometer of the event location, for at least one hour prior to and after the event occurrence time. Accordingly, the configured processor dynamically displays within an augmented device display, for the period extending from one hour prior to the event occurrence and extending to one hour after the scheduled end of the event, to a first (civilian) vehicle operator "DO NOT ENTER" signs over or next to roadways having a portion within the one-kilometer distance, including those portions outside of the one-kilometer distance that extend to an intersection outside of the one-kilometer dimension; and to another, life-safety person (police, firefighter, emergency medical technician) "SAFETY PERSONNEL ONLY" over or next to same roadways or portions thereof, thereby communicating their preferential access.

Figure 6A:
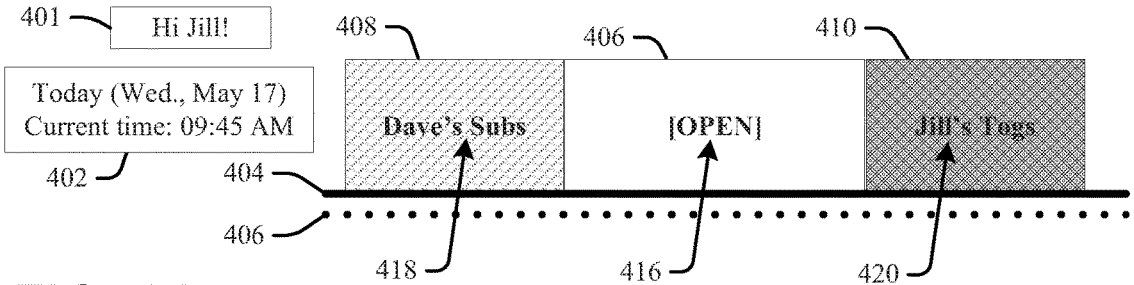
FIGS. 6A, 6B and 6C are graphical illustrations of another implementation of an embodiment of the present invention.
Figure 6B:
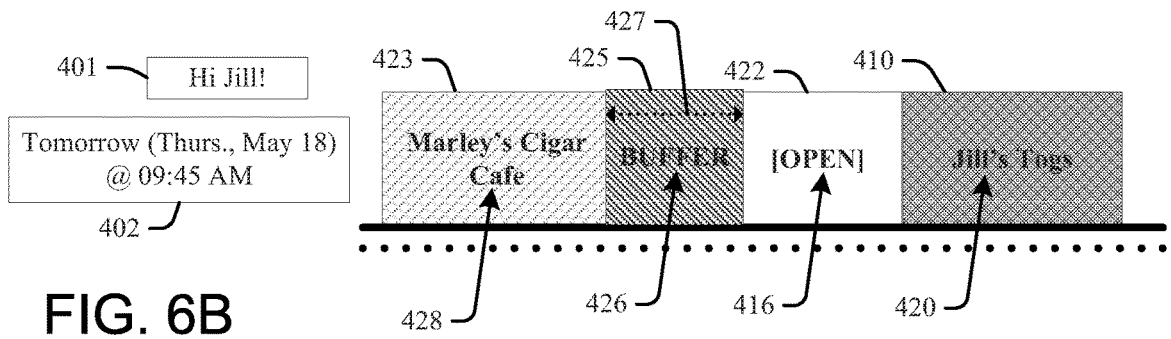
Figure 6C:
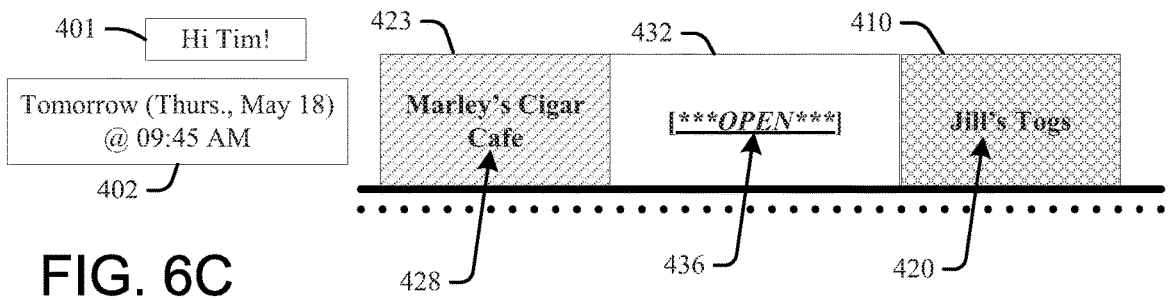

FIGS. 6A, 6B and 6C illustrate an example according to the present invention wherein a configured processor generates different respective augmented reality displays of an aisle 404 that is defined within a marketplace assembly area (for example, an exposition hall, a public street, park, a parking lot, a mall corridor, etc.) for different values of time and/or viewing-user attributes users. In the illustrations only the aisle 404 is physically present or visible to a viewer with the naked eye, without use of an augmented display device, and the rest of the elements depicted within the respective views are dynamically created and displayed within an augmented reality device display view of the aisle 404.

FIG. 6A conveys the current status of three different kiosk spaces 406, 408 and 410 that are defined along the aisle 404, as indicated by a temporal text data key 402 displayed within the view, and customized to the attributes of a user "Jill," as indicated by the legend text 401 displayed to the user ("Hi Jill!"). The display represented by FIG. 6A conveys that Jill has currently rented kiosk space 410 for her business, as indicated by legend text "Jill's Togs" 420, and by the solid shading of the region 410; kiosk 408 is indicated as reserved by another person (via the cross-hatching shading within the shape 408), for another business "Dave's Sub" indicated by legend text 418, and thus not available for Jill to reserve; and kiosk region 406 located therebetween is indicated as available for rent by Jill via the legend text content "OPEN" 416, and by the blank (not shaded or cross-hatched) format of the kiosk space 406.

The dimensions of each of the kiosk regions are defined to the scale 407 (for example, wherein each dot is one meter, or one foot, etc.) While the present example uses differential gray-scale shading to distinguish respective defined areas and boundaries, other embodiments may use differential coloring, text data fonts, etc.

FIG. 6B conveys the status of aisle 404 as a function of Jill's personal attributes (setting, preferences, historic tags, etc.) at a future time, as indicated by revised text values of the temporal text data key 402 (for the next day, "tomorrow," at the same time), which may be driven in response to an input to the augmented device by Jill (for example, through a verbal command of "show me the reservations for tomorrow at this time," via using hand and finger gesture selecting a region or area range, through an input to a graphical user interface (GUI), and still other inputs will be appreciated by one skilled in the art). FIG. 6B conveys that Jill has rented the same kiosk space 410 for her business at that future time, as indicated by legend text "Jill's Togs" 420, and by the solid shading of the region 410. Another kiosk space 423 is indicated as reserved by another person (via the cross-hatching shading within the shape 423) that differs in dimension from the space 408 of FIG. 6A, and with respect to use, as identified by legend text 428 as "Marley's Cigar Café".

A buffer area 425 (identified by legend text 426 and differential shading relative to the other areas 423, 422 and 410) is generated to create or ensure a minimum separation distance between first and second regions 423 and 410 in response to a preference attribute specified for the user Jill. In the present example the buffer 425 is defined by a width dimension 427 specified as a minimum distance or "buffer" required from location of Jill's business or intended use of the kiosk reservation 410 from cigar sales or uses or certain other activities, for example to ensure that her reservation is not directly next to such a use, conveying that is space is required as a buffer between the cigar café and her reservation. A small, resulting remainder kiosk region 422 is located between Jill's reserved space 410 and the buffer zone 425 and indicated as "open" or available for rent by Jill via the legend text content "OPEN" 416 and by the blank format of the space 422. Thus, Jill can quickly confirm that the reservations established for tomorrow meet her requirements and considering also expanding into or otherwise using the other available open space 422 or a portion thereof. Alternatively, in response to learning that "Marley's Cigar Café" will be located next to her kiosk location tomorrow, Jill may determine that her reserved location space 410 is not likely to be perceived as desirable to her client base, regardless of meeting her buffer requirement, and decide to release her reservation and seek another space farther away from "Marley's Cigar Café."

FIG. 6C conveys the status of the aisle 404 at the same future time as that of FIG. 6B (indicated by the common text values of the temporal text data key 402), but wherein aisle regions 423, 432 and 410 are configured and displayed as a function of the personal attribute(s) of a different user "Tim" (see the revised text content of legend 401). FIG. 6C conveys via cross-hatching shading each of that kiosk spaces 410 and 423 with common dimensions as depicted in FIG. 6B are rented (reserved) by other persons ("Jill's Togs" and "Marley's Cigar Café" respectively, as indicated their legend text data displays 428 and 420).

In contrast to Jill, Tim does not have a personal attribute indicative of a requirement for a buffer zone adjacent to the sales or other use attribute of "Marley's Cigar Café," and thus the configured processor does not determine, create or present the buffer area 425 to Tim. Further, Tim has another personal attribute value that is indicative of a preference for association to either of the "Jill's Togs" and "Marley's Cigar Café" use attributes relative to other potential uses of regions along the aisle 404. Accordingly, in response to determining this preference of Time the embodiment defines the open space 432 to span the entire open area between the regions 423 and 410, and highlights the open space 432 as preferred over other potential open spaces: in the present example, the text legend 436 frames the word "open" with sets of three "stars" or asterisks, conveying a three-star preference on a scale of five possible stars, and wherein the text font is italicized and underlined for enhanced emphasis, relative to the open legend text information 416.

Thus, in response to revising a temporal context to a different, past (historic) or future time embodiments determine and display different representations of area use configurations and combinations for a given geographic location, wherein the a user may readily understand how different areas are, were or will be occupied or used by different activities, establishments, stalls, etc. in an intelligent and intuitive planning process.

Embodiments thus provide method and systems for configuring and using augmented reality glasses, googles and other display screen devices to dynamically visualize areas within a real-world with logically defined geographic boundaries that convey restrictions or some other attribute of use, such as physically occupied, restricted, reserved, booked, or their corollaries (for example, open, available, safe, not-booked, etc.). Defined areas may be highlighted dynamically, and safe boundaries or buffer zones created in visual surroundings presented through augmented reality display screens in response to processing information regarding current or projected, future events as function of user, temporal and geo-spatial location attributes.

Embodiments provide advantages in enabling users to use augmented reality display screens to rapidly and easily generate, create and review different visual representations of differential uses of sub-regions or areas of a larger physical space over different time periods to solve for and satisfy competing requirements of different user-viewer and regional use attribute values, and to dynamically game-plan or explore alternate scenarios by changing ones of the attribute values and reviewing alternative configurations resulting therefrom. Embodiment provide time and efficiency advantages over conventional conflict management solutions for meeting competing requirements of different users in planning allocations during large, complex mass assembly events, including concerts, fairs, bazaars, markets and sporting events with multiple, independently allocated food service and vendor areas, and educational open-houses and job fairs at colleges and universities, etc.

Embodiments provide advantages in area visualization over conventional planning methods and systems. Using augmented reality glasses, users can visualize logically or physically-occupied, booked geographic boundaries by any establishment, stall, individual, object, etc. in two or three-dimensional diagrammatic representations, and thereby readily review and understand how different areas are occupied or booked by different establishments, stalls, objects, individuals, etc., and thereby also visualize areas not yet occupied or booked by anybody, without requiring the actual, physical presence of occupying objects, structures, etc., to understand and visualize the composite scene.

Contextual Boundary fetching: by using augmented reality systems, embodiments show occupancy schedule details of different geographic boundaries in a date-time calendar interface that enables users to quickly identify available areas and associated limiting time slots, wherein the booking or occupancy status of any place or portion thereof can be visualized in a calendar, so that a user can identify which area is not yet booked, and accordingly use augmented reality system input structures to select an area and book an associated time slot.

Agreement-enabled area transfer mechanisms. Embodiments may use augmented reality system inputs to allow users to transfer one or more occupied area to another user, person, stall, establishment, etc., or to merge two or more adjacent occupied areas, wherein a remote server or other central or arbitrating system immediately, in real-time, responsively updates changes in area allocations or availabilities and reservations displayed to other users via their own augmented reality devices, including as personalized in response to different user attributes, preferences, requirements, etc. Merger of regions or selected boundaries or revision thereto may be dependent upon validation, for example, verifying that the user has ownership or other rights to change or revise the defined boundary, or that another user or entity that has such rights confirms agreement to the merger or revision.

Embodiments may also quickly identify and prevent encroachment of one property owner onto another property, or other improper use. By ingesting survey and property definition and regulatory data (for example, waterline boundaries or proximate area use restrictions dynamically defined by controlling governmental entity laws or regulations, lot line offset requirements that vary based on date of lot creation, etc.), boundaries between neighboring lots or public lands or uses, and permissible building and improvement regions, are automatically and dynamically determined and displayed within augmented reality display screens, wherein property owners or leasers or governmental inspection and permitting authorities can easily identify and prevent improper usage prior to an encroachment occurrence, or to identify an encroachment after it has happened, etc. This provides advantages over conventional systems that require knowledge, application and interpretation of a wide variety of dissimilar information (platted and actual border lines, applicable current and grand-fathered laws and regulations, special use requirements unique to certain user attributes or identities, etc.), wherein the likelihood of wrong determinations from the omission or consideration of the wrong limiting regulations, uses, etc. increases with the complexity of the situation. In contrast, embodiments of the present invention easily scale up to accommodate and resolve conflicts between large multiples of user and use attribute and restriction data, including in dynamic response to real-time changes in the data.

Augmented reality display screens may generally enable users to freely navigate physical surroundings during usage, enabling the user to inspect or view their surroundings while walking, driving, bicycling, etc., while looking through the glasses, goggles or other small, personally worn or carried display screens, wherein the embodiments drive the screens to display and differentiate regions based on boundary detection (via geographic coordinates, or recognizing locations from processing image data, including address placards and object identification, etc.). Thus, embodiment drive the augmented reality system to show area boundary structures or indications to the user within the context of their visible surroundings, without requiring the presence of physical boundary objects (fencing, markers, etc.).

Via centralized cloud resource, server or other communications the augmented reality system embodiment connect to remote resources to retrieve booked area coordinates, regulations, calendar data, etc., and based on the user's geographic position or location within a physical area, relative geo-position of booked and other defined areas are identified and displayed in the augmented reality device.

Historical pattern analysis. By analyzing historical user and regional usage and regulation data analysis, embodiments may quickly and autonomously define geo-fencing exclusion and buffer areas for event, object, individuals, etc. For example, in response to identifying a type of animal present within image data of a portion of a hiking path (moose, salamander, etc.), embodiments define a safe-distance buffer region for the animal type as a function of the location attribute (for example, one kilometer for a moose on hiking trail, or two kilometers on a public roadway; one meter for a salamander on a water edge, or closure of the trail from a last trail head during a migration season, etc.) and project the region from the dynamic location of the animal: it moves as the animal moves, so that it originates and is dynamically defined by reference to the current location of the animal. Thus, the augmented reality system shows current physical safe distance from the identified animal to the user as both user and animal move and change their points of reference.

Embodiment may use a variety of data inputs and data processing systems, including Internet of Things (IoT) image, motion, sound, temperature and other sensor feeds. Embodiments may recognize and identify objects present in visual data acquired from user surroundings via recognition-based convolutional neural network (R-CNN) processes, visual simultaneous localization and mapping (SLAM) mapping and navigation processes, and still other appropriate processes will be appreciated by one skilled in the art. Embodiments may determine and differentiate regional area boundaries, including safe distances, as a function of distance to identified objects, attributes thereof and surrounding context (for example, public or private spaces, occupation density, etc.).

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising:
    defining a first boundary dimension value for a first area with respect to a reference geographic location as a function of values of a current time, an attribute of an event occurring at the location and an attribute of a user of an augmented reality device;
    rendering the first area within a display of the reference geographic location by a display device of the user augmented reality device in a display format that displays the current time value and visually distinguishes the first area from a second area visually rendered within the display of the reference geographic location, wherein the display format conveys different values of use permission determined for the user for each of the first area and the second area as a function of the values of the current time and the event attribute and the user attribute, and wherein the second area is defined by a second boundary dimension value that is different from the first boundary dimension value;
    dynamically revising the first boundary dimension value as a function of a change in value of the user attribute and a change in the time value to a future time value, wherein the change in value of the user attribute is responsive to the change in the time value; and
    revising the rendering of the first area within the augmented reality device display to display the future time value and to visually distinguish the first area from the second area visually rendered within the display of the reference geographic location as a function of the dynamically revised first boundary dimension value and the user attribute value.

2. The method of claim 1, wherein revising the rendering of the first area comprises revising a display format of the first area to indicate a change in value of the use permission determined as a function of a change in value of at least one of the user attribute and the event attribute.

3. The method of claim 2, further comprising:
    determining occurrence of the event by identifying an attribute type value of an object located at the location;
    defining the first boundary dimension value as a first radius extending from the reference location a minimum safe working distance specified for the object attribute type value and for a qualification category value of the user attribute that is associated to the object attribute type value; and
    selecting the display format of the rendering of the first area to convey the use permission determined for the first area as a function of the qualification category value of the user attribute meeting an entry requirement.

4. The method of claim 3, further comprising:
defining the second boundary dimension value a second radius extending from the reference location a potential exposure distance specified for a hazard associated to the attribute type value of the object, wherein the second radius is different from the first radius; and
selecting the display format of the rendering of the second area to convey that the use permission determined for the second area restricts entry to the second area to persons having a specified user attribute qualification category value.

5. The method of claim 4, further comprising:
dynamically revising one of the first boundary dimension value and the second boundary dimension value in response to a change in a state of the object attribute type value.

6. The method of claim 3, further comprising:
defining the second boundary dimension value as a portion of a roadway extending from within the first area to an intersection with another roadway.

7. The method of claim 3, further comprising:
defining the second boundary dimension value to create a buffer distance between the first region and a location attribute value of the event.

8. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer readable storage medium via the computer readable memory and thereby performs the defining the first boundary dimension value as the function of the values of the current time, the event attribute and the user attribute, the rendering the first area within the display, the dynamically revising the first boundary dimension value as the function of the change in value of the user attribute and the change in the time value to the future time value, and the revising the rendering of the first area within the augmented reality device display to display the future time value and to visually distinguish the first area from the second area visually rendered within the display of the reference geographic location as a function of the dynamically revised first boundary dimension value and the user attribute value.

9. The method of claim 8, wherein the computer-readable program code is provided as a service in a cloud environment.

10. A computer system, comprising:
a computer processor;
a computer readable memory in circuit communication with the computer processor; and
a computer readable storage medium in circuit communication with the computer processor;
wherein the computer processor executes program instructions stored on the computer readable storage medium via the computer readable memory and thereby:
defines a first boundary dimension value for a first area with respect to a reference geographic location as a function of values of a current time, an attribute of an event occurring at the location and an attribute of a user of an augmented reality device;
renders the first area within a display of the reference geographic location by a display device of the user augmented reality device in a display format that displays the current time value and visually distinguishes the first area from a second area visually rendered within the display of the reference geographic location, wherein the display format conveys different values of use permission determined for the user for each of the first area and the second area as a function of the values of the current time and the event attribute and the user attribute, and wherein the second area is defined by a second boundary dimension value that is different from the first boundary dimension value;
dynamically revises the first boundary dimension value as a function of a change in value of the user attribute and a change in the time value to a future time value, wherein the change in value of the user attribute is responsive to the change in the time value; and
revises the rendering of the first area within the augmented reality device display to display the future time value and to visually distinguish the first area from the second area visually rendered within the display of the reference geographic location as a function of the dynamically revised first boundary dimension value and the user attribute value.

11. The system of claim 10, wherein the processor executes program instructions stored on the computer readable storage medium via the computer readable memory and thereby revises the rendering of the first area by revising a display format of the first area to indicate a change in value of the use permission determined as a function of a change in value of at least one of the user attribute and the event attribute.

12. The system of claim 11, wherein the processor executes program instructions stored on the computer readable storage medium via the computer readable memory and thereby:
determines occurrence of the event by identifying an attribute type value of an object located at the location;
defines the first boundary dimension value as a radius extending from the reference location a minimum safe working distance specified for the object attribute type value and for a qualification category value of the user attribute that is associated to the object attribute type value; and
selects the display format of the rendering of the first area to convey the use permission determined for the first area as a function of the qualification category value of the user attribute meeting an entry requirement.

13. The system of claim 12, wherein the processor executes program instructions stored on the computer readable storage medium via the computer readable memory and thereby:
defines the second boundary dimension value a second radius extending from the reference location a potential exposure distance specified for a hazard associated to the attribute type value of the object, wherein the second radius is different from the first radius; and
selects the display format of the rendering of the second area to convey that the use permission determined for the second area restricts entry to the second area to persons having a specified user attribute qualification category value.

14. The system of claim 13, wherein the processor executes program instructions stored on the computer readable storage medium via the computer readable memory and thereby:

dynamically revises one of the first boundary dimension value and the second boundary dimension value in response to a change in a state of the object attribute type value.

15. The system of claim 12, wherein the processor executes program instructions stored on the computer readable storage medium via the computer readable memory and thereby:

defines the second boundary dimension value as a portion of a roadway extending from within the first area to an intersection with another roadway.

16. The system of claim 12, wherein the processor executes program instructions stored on the computer readable storage medium via the computer readable memory and thereby:

defines the second boundary dimension value to create a buffer distance between the first region and a location attribute value of the event.

17. A computer program product, comprising:

a non-transitory computer readable storage medium having computer readable program code embodied therewith, the computer readable program code comprising instructions for execution by a computer processor that causes the computer processor to:

define a first boundary dimension value for a first area with respect to a reference geographic location as a function of values of a current time, an attribute of an event occurring at the location and an attribute of a user of an augmented reality device;

render the first area within a display of the reference geographic location by a display device of the user augmented reality device in a display format that displays the current time value and visually distinguishes the first area from a second area visually rendered within the display of the reference geographic location, wherein the display format conveys different values of use permission determined for the user for each of the first area and the second area as a function of the values of the current time and the event attribute and the user attribute, and wherein the second area is defined by a second boundary dimension value that is different from the first boundary dimension value;

dynamically revise the first boundary dimension value as a function of a change in value of the user attribute and a change in the time value to a future time value, wherein the change in value of the user attribute is responsive to the change in the time value; and revise the rendering of the first area within the augmented reality device display to display the future time value and to visually distinguish the first area from the second area visually rendered within the display of the reference geographic location as a function of the dynamically revised first boundary dimension value and the user attribute value.

18. The computer program product of claim 17, wherein the instructions for execution cause the computer processor to revise the rendering of the first area by revising a display format of the first area to indicate a change in value of the use permission determined as a function of a change in value of at least one of the user attribute and the event attribute.

19. The computer program product of claim 18, wherein the instructions for execution cause the computer processor to:

determine occurrence of the event by identifying an attribute type value of an object located at the location;

define the first boundary dimension value as a radius extending from the reference location a minimum safe working distance specified for the object attribute type value and for a qualification category value of the user attribute that is associated to the object attribute type value; and select the display format of the rendering of the first area to convey the use permission determined for the first area as a function of the qualification category value of the user attribute meeting an entry requirement.

20. The computer program product of claim 18, wherein the instructions for execution cause the computer processor to define the second boundary dimension value to create a buffer distance between the first region and a location attribute value of the event.

* * * * *